Sept. 4, 1934.  E. STRACK  1,972,802
SUPPORT FOR EMBROIDERY RINGS AND THE LIKE
Filed May 26, 1933
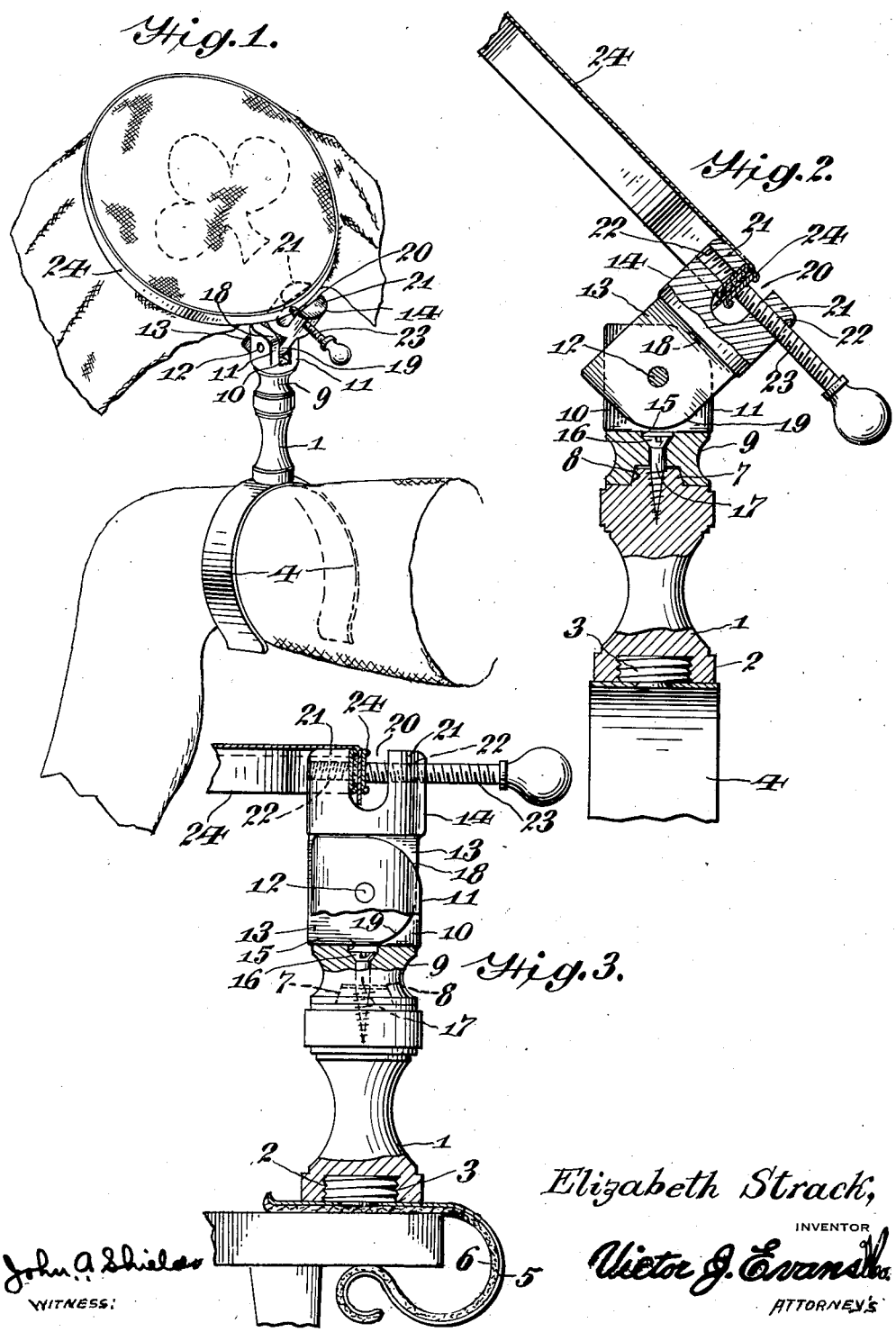
Elizabeth Strack,
INVENTOR Patented Sept. 4, 1934

1,972,802

UNITED STATES PATENT OFFICE 1,972,802

SUPPORT FOR EMBROIDERY RINGS AND THE LIKE

Elizabeth Strack, Philadelphia, Pa.

Application May 26, 1933, Serial No. 673,119

1 Claim. (Cl. 45—24)

The present invention relates to an improved support for embroidery rings and the like, and a purpose of the invention is to provide a support comprising a base section with means to support it on the leg of an operator or on the edge of a table or other suitable substantially stationary element, in combination with a second section swivelled on the base section for adjustment axially with the base section regardless of its position, there being a third section pivotally supported on the second section for pivotal movement at right angles to the swivel movement, the second section including a bifurcation, in which the third section is mounted for said pivotal movement, the third section also being bifurcated, in between the jaws (caused to be formed by said bifurcation) of which an embroidery ring or the like may be clamped by a hand screw, enabling the embroidery ring or the like to have various universal movements, facilitating the operation of passing a needle back and forth through a piece of fabric on which embroidery work is being accomplished.

It is to be understood that the particulars here in given are in no way limitative, and that while still keeping within the scope of the invention, any desired modification of details and proportions may be made in the construction of the appliance according to circumstances.

The invention comprises further features and combination of parts to be hereinafter set forth, shown in the drawing and claimed.

In the drawing:—

Figure 1 is a view in perspective of the improved support constructed in accordance with the invention, showing it mounted upon the leg of an operator, at a point just above the knee.

Figure 2 is a view in side elevation with parts in section showing the construction of the support more in detail.

Figure 3 is a view in elevation showing the support including a clamp at the lower end of the base section for mounting the support on a table or the like.

Referring to the drawing 1 identifies a base section, the lower end of which being provided with a threaded socket 2 for the reception of a threaded boss 3, which may be carried by an open ended spring band 4 as in Figures 1 and 2, or by a clamp 5 as in Figure 3, the clamp 5 being provided with a felt lining 6 to guard against the clamp marring or otherwise disfiguring the finish of a table top. This felt 6 may be fastened to the clamp in any suitable manner preferably by cement or the like.

The upper end of the base section 1 has a tapered boss 7 which enters a similar shaped socket 8 of a second section 9 of the support, thereby allowing the second section to have swivelled movements enabling the second section to be adjusted in various positions. The second section is formed with a bifurcation 10, the construction of which causes forks or lugs 11 to be formed. Pivoted on a pin 12 mounted in forks or lugs 11 is an ear 13 of a third section 14 of said support. The ear 13 is of such thickness as to insure friction against the adjacent faces of the lugs or forks 11, so that the third section of the support may be held in different positions through the medium of friction.

An opening 15 is formed through the base of the second section of the support, and the upper end of this opening 15 is countersunk from the bottom of the bifurcation 10 for the reception of the head 16 of a screw 17, which is threaded down through the boss 7 and into the base section, thereby swively mounting the second section of the support, whereby it may have swivel movements enabling the second section to be adjusted in various positions. Since the base section may be, as in Figure 1 supported upon the leg of an operator just above the knee through the medium of a band, it is possible to adjust the base section to various positions.

Certain corners of the lugs or forks 11 are curved off as shown at 18, while the ear has one of its corners curved off at 19 to allow pivotal tilting movement of the third section of the support, allowing the third section to be tilted toward the operator or from the operator, it depending entirely upon what position the second section may assume relative to the base section.

The third section of the support has a bifurcation 20 causing lugs or forks 21 to be formed, and which are provided with opposite threaded openings 22, either one of which may receive a hand screw 23, for the purpose of engaging against an embroidery ring or other embroidery frame or the like, which may engage within the bifurcation 20, as is shown in the drawing.

By this construction it is possible to arrange the embroidery ring 24 in various positions, such as will facilitate the passing of a needle back and forth through the fabric which is stretched over the embroidery ring for the purpose of embroidering the fabric with any suitable design. As is obvious the hand screw 23 may enter either one of the lugs or forks 21, in order to better facilitate the movement of the ring and hence facilitate in embroidering the piece of fabric.

The invention having been set forth, what is claimed is:

In a support for embroidery rings and the like, a pedestal support comprising a base section having means for supporting the base section on an element, said pedestal support including a second section, the adjacent ends of the base and second section having a boss and socket connection including a screw for swivelly mounting the second section, the upper end of the second section having a bifurcation and adjoining lugs, the latter to receive a pivot pin, said pedestal support including a third section having an ear frictionally engaging in the bifurcation and between the lugs and mounted upon the pivot pin, said ear and lugs having certain of their corners curved off allowing the third section to have pivotal movement in one direction only, said ear and lugs having corners, the corner of the ear to engage the bottom of the bifurcation and the corners of the lugs to engage a wall of the third section, the corners of the ear and those of the lugs so cooperating with the bottom of the bifurcation and said wall to prevent pivotal movement in the opposite direction, the third section having a bifurcation and adjoining lugs, and a hand screw to engage through any one of the last named lugs to clamp an embroidery ring in the last named bifurcation.

ELIZABETH STRACK.